United States Patent
Sheikh et al.

(10) Patent No.: US 10,515,413 B1
(45) Date of Patent: Dec. 24, 2019

(54) SYSTEM AND METHOD FOR DYNAMICALLY ADAPTING ASSET ALLOCATION AND WITHDRAWAL RATES

(71) Applicant: JPMorgan Chase Bank, N.A., New York, NY (US)

(72) Inventors: Abdullah Z. Sheikh, New York, NY (US); Sara K. Roy, Pennington, NJ (US); Anne Lester Trevisan, Princeton, NJ (US); Michael I. Falcon, Princeton, NJ (US); Lynn A. Avitabile, Summit, NJ (US); Peter H. Zhang, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 468 days.

(21) Appl. No.: 14/503,599

(22) Filed: Oct. 1, 2014

Related U.S. Application Data

(60) Provisional application No. 61/887,628, filed on Oct. 7, 2013.

(51) Int. Cl.
*G06Q 40/06* (2012.01)

(52) U.S. Cl.
CPC .................. *G06Q 40/06* (2013.01)

(58) Field of Classification Search
CPC ........ G06Q 40/06; G06Q 40/04; G06Q 30/08; G06Q 40/02
See application file for complete search history.

(56) References Cited

U.S. PATENT DOCUMENTS

| | | | | |
|---|---|---|---|---|
| 7,774,826 | B1 * | 8/2010 | Romanek | H04L 67/306 726/1 |
| 8,185,463 | B1 * | 5/2012 | Ball | G06Q 40/00 705/36 R |
| 2007/0299758 | A1 * | 12/2007 | Zosin | G06Q 40/06 705/36 R |
| 2008/0010181 | A1 * | 1/2008 | Infanger | G06Q 40/04 705/36 R |
| 2009/0018969 | A1 * | 1/2009 | Ayres | G06Q 40/00 705/36 R |
| 2010/0017342 | A1 * | 1/2010 | Boscaljon | G06Q 40/06 705/36 R |

(Continued)

FOREIGN PATENT DOCUMENTS

WO WO-0169348 A2 * 9/2001 ............. G06Q 40/08

OTHER PUBLICATIONS

Blake at al. ("Optimal Funding and Investment Strategies in Defined Contribution Pension Plans under Epstein-Zin Utility", Actuarial Research Paper No. 186, Cass Business School, City University London, Oct. 2008).*

(Continued)

*Primary Examiner* — Virpi H Kanervo
(74) *Attorney, Agent, or Firm* — Greenblum & Bernstein, P.L.C.

(57) ABSTRACT

Methods and systems for generating a recommended retirement profile for a retiree are disclosed herein. An indication to generate, for a retiree, a recommended retirement profile is received. A plurality of decumulation parameters are identified, and a utility function is computed based on the decumulation parameters. The recommended retirement profile is generated based on the computed utility function.

21 Claims, 7 Drawing Sheets

(56) References Cited

U.S. PATENT DOCUMENTS

| | | | | |
|---|---|---|---|---|
| 2011/0016067 A1* | 1/2011 | Levchuk | ................ | G06Q 50/20 706/12 |
| 2013/0053086 A1* | 2/2013 | Akitomi | ................ | H04W 4/023 455/517 |
| 2014/0058976 A1* | 2/2014 | Goodrich | ............... | G06Q 40/06 705/36 R |
| 2014/0143175 A1* | 5/2014 | Greenshields | ......... | G06Q 40/06 705/36 R |
| 2015/0066811 A1* | 3/2015 | Legare | .................. | G06Q 40/06 705/36 R |
| 2015/0095265 A1* | 4/2015 | Feinendegen | .......... | G06Q 40/06 705/36 R |
| 2015/0127581 A1* | 5/2015 | Castille, III | ........... | G06Q 40/06 705/36 R |

OTHER PUBLICATIONS

Fwu-Rang Chang. Uncertain Lifetimes, Retirement and Economic Warfare. Economica, New Series, vol. 58, No. 230 (May 1991), pp. 215-232.*

* cited by examiner

SYSTEM AND METHOD FOR DYNAMICALLY ADAPTING ASSET ALLOCATION AND WITHDRAWAL RATES

CROSS REFERENCE TO RELATED APPLICATION

This application claims the benefit of priority of U.S. Provisional Patent Application No. 61/887,628, filed Oct. 7, 2013, which is hereby incorporated by reference herein in its entirety.

TECHNICAL FIELD

Embodiments of the invention relate generally to generating a retirement plan for a retiree and, more specifically, to generating and providing a recommendation for withdrawal rates and asset allocation.

BACKGROUND

Traditional retirement strategies have been successful during periods of economic stability. However, such strategies often implement portfolio withdrawal rates based on static rules, making them susceptible to economic downturns and market volatility.

Accordingly, there is a desire to develop retirement strategies that implement more robust withdrawal frameworks over the course of many years, which leverage retirement funding needs against market and longevity risks in ways that traditional retirement strategies cannot.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
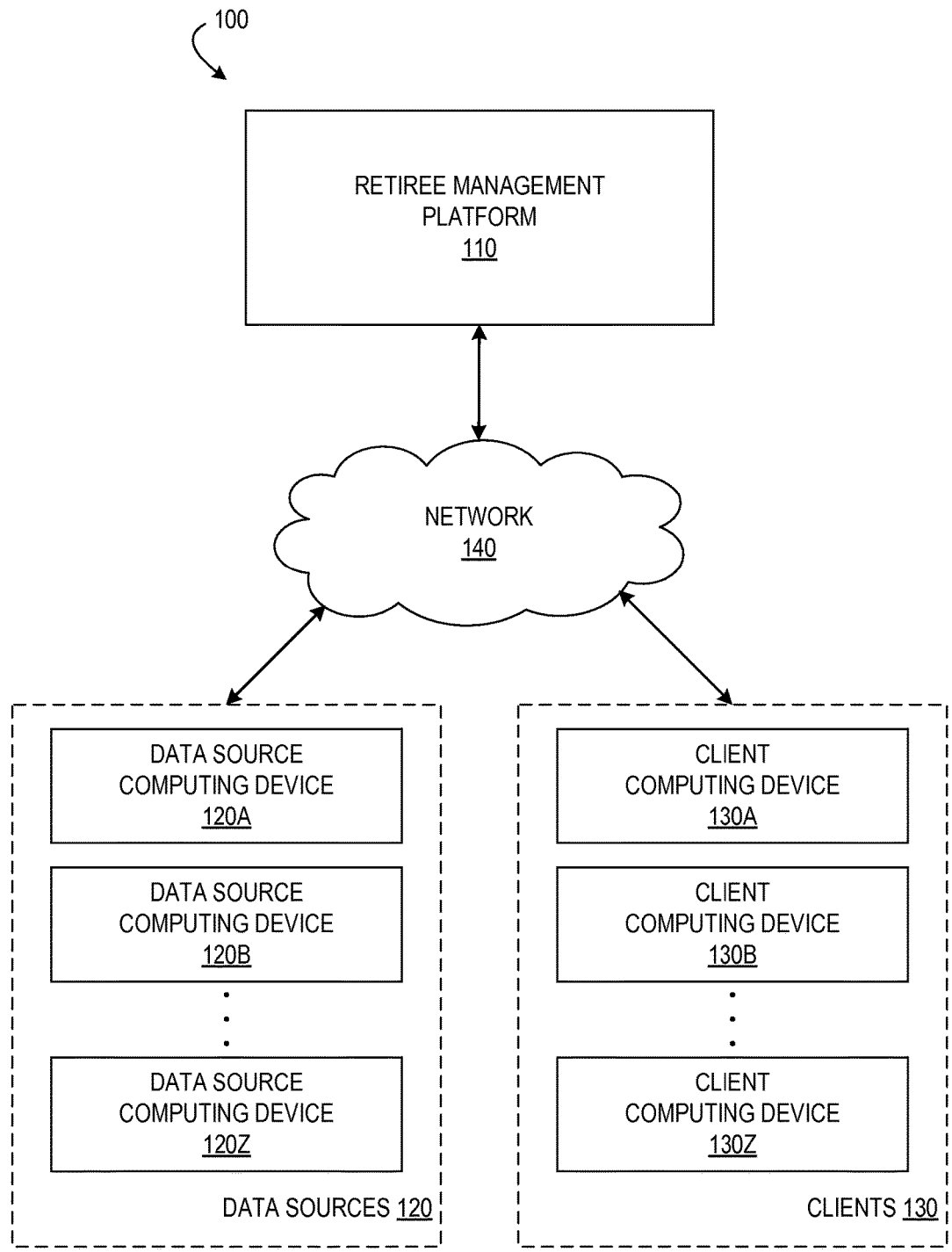
FIG. 1 is a block diagram illustrating an exemplary computer network in which embodiments of the present invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions may be presented in terms of algorithms and symbolic representations of operations on data bits within a computer memory. These algorithmic descriptions and representations correspond to the terminology used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the description that follows, it is appreciated that throughout the description, discussions utilizing terms such as "receiving", "detecting", "monitoring", "generating", "calculating", "transmitting", "enrolling", "identifying", "measuring", "recommending", "designating", "increasing", "issuing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relate to an apparatus for performing the operations herein. This apparatus may be specially constructed for the required purposes or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the relevant method steps. The structure for a variety of these systems will be apparent from the description that follows. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary computer network 100 in which embodiments of the present invention may operate. Referring to FIG. 1, computer network 100 may include a computer-enabled retiree management platform 110, a plurality of data source computing devices 120A-120Z, which are associated with and collectively referred to herein as data sources 120. Computer network 100 may also include a plurality of client computing devices 130A-130Z, which are associated with and may be collectively referred to herein as clients 130. Retiree management platform 110 may be communicatively coupled directly or via a communications network 140. Data source computing devices 120A-120Z associated with data sources 120 may be communicatively coupled to communications network 140 via any one of a plurality of communication channels (e.g., e-mail, SMS service, automated voice message, etc.). Similarly, client computing devices 130A-130Z associated with clients 130 may also be communicatively coupled to communications network 140 via any one of the plurality of communication channels. Communications network 140 may be a private network (e.g., a local area network (LAN), wide area network (WAN), intranet, etc.), a public network (e.g., the Internet), a cellular network or any combination thereof.

Figure 2:
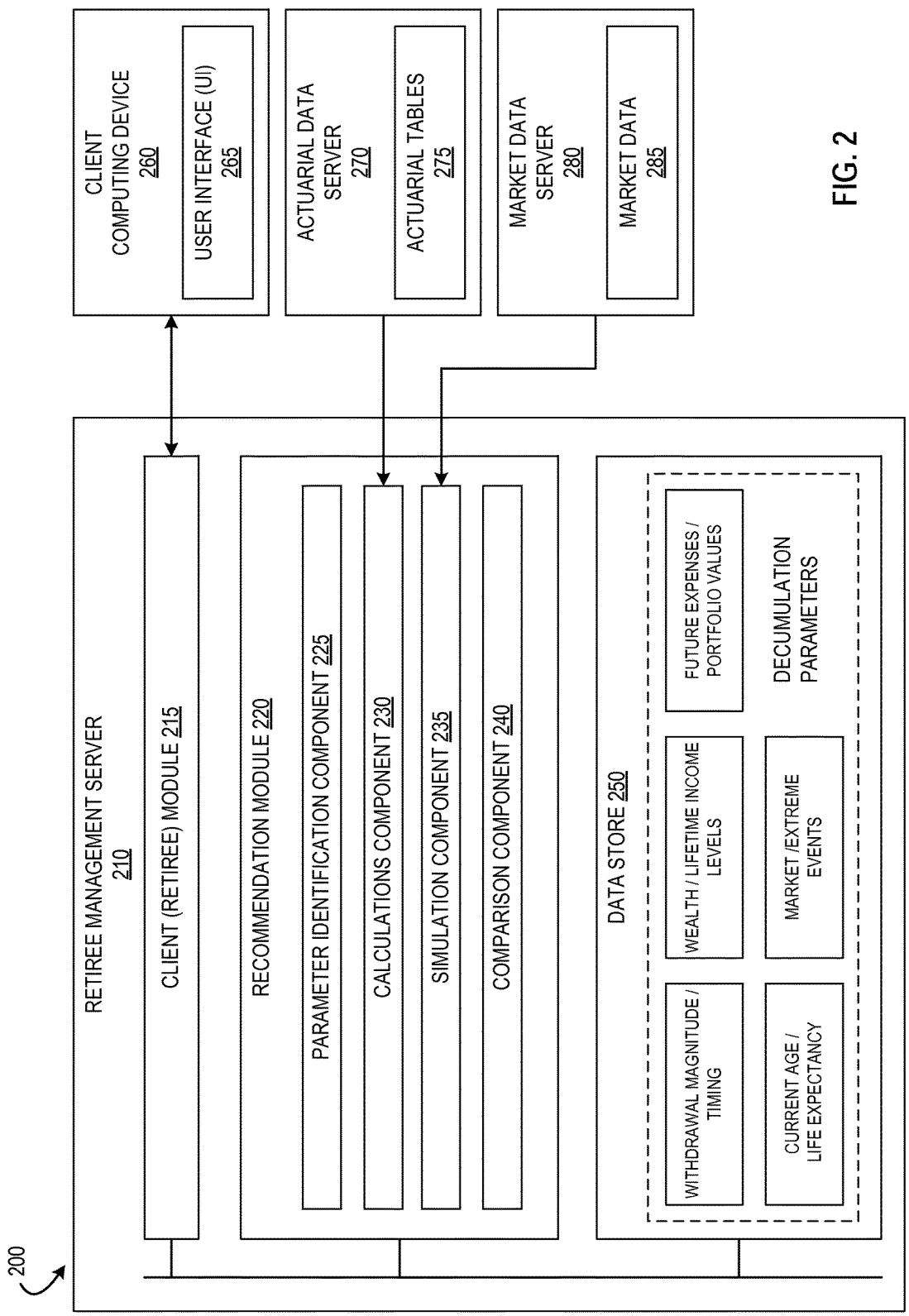
FIG. 2 is a block diagram illustrating an exemplary retiree management platform in accordance with an embodiment of the invention.

FIG. 2 is a block diagram illustrating an exemplary retiree management platform 200 in accordance with an embodiment of the invention. Retiree management platform 200 may be the same or similar to, and have the same functionality and connectivity as, retiree management platform 110 described with respect to FIG. 1. Retiree management platform 200 may include a retiree management server 210. Although retiree management server 210 is depicted as a single server, retiree management server 210 may be one or more computing devices (such as a rackmount server, a router computer, a server computer, a personal computer, a mainframe computer, a laptop computer, a tablet computer, a desktop computer, etc.), and include one or more data stores (e.g., hard disks, memories, databases), networks, software components, and/or hardware components.

Retiree management server 210 may include one or more modules configured to generate a recommended retirement profile for a retiree. Retiree management server 210 includes client module 215, recommendation module 220, and data store 250. The recommendation module includes a parameter identification component 225, a calculations component 230, a simulation component 235, and a comparison component 240. More or less modules and components may be included in retiree management server 210 without loss of generality. For example, two or more of the modules may be combined into a single module, or one of the modules may be divided into two or more modules. In one embodiment, one or more of the modules may reside on different computing devices (e.g., different server computers, on a single client device, distributed among multiple client devices, etc.).

Retiree management platform may also include client computing device 260 (which may be the same as or similar to any one of client computing devices 130A-130Z), actuarial data server 270 and market data server 280. Each of actuarial data server 270 and market data server 280 may be the same as or similar to any one of data source computing devices 120A-120Z. Each of client computing device 260, actuarial data server 270, and market data server 280 may be communicatively coupled to retiree management server 210 via a communications network (e.g., communications network 140).

In one embodiment, client module 215 may be communicatively coupled to client computing device 260. Client computing device 260 may be referred to as a "user device". An individual user (e.g., the retiree) may be associated with (e.g., own and/or operate) client computing device 260, and may also be associated with additional client computing devices (e.g., one or more of client computing devices 130A-130Z). Client computing device 260 may be owned and utilized by different users at different locations (e.g., a retiree and a spouse of the retiree). Client computing device 260 includes a user interface (UI) 265, which allows the retiree to send and receive information to retiree management server 210 via client module 215. For example, UI 265 may be a web browser interface that can access, retrieve, present, and/or navigate content (e.g., web pages such as Hyper Text Markup Language (HTML) pages) provided by retiree management server 210. In one embodiment, UI 265 may be a standalone application (e.g., a mobile app), which may have been provided to the retiree by client module 215, and allows the retiree to send and receive information to client module 215.

In one embodiment, retiree management server 210 may maintain a retirement account of the retiree, which may be stored in data store 250. The retirement may be a retirement account of the retiree, or a joint account shared by the retiree and his/her spouse. The retiree may be able to access his/her account details from client computing device 260 using UI 265, and may be able to provide personal information and retirement account preferences (hereinafter referred to as "parameters", "retirement parameters", or "decumulation parameters") to client module 215, which then stores the parameters in data store 250. The stored parameters are then retrieved from data store 250 by recommendation module 220 and used to generate a recommended retirement profile for the retiree. The parameters may include, for example, withdrawal magnitude/timing, wealth/lifetime income levels, future expenses/portfolio values, current age/life expectancy, market/extreme events, etc., in which some or all of these parameters may be provided by the retiree directly or may be obtained from one or more data sources (e.g., actuarial data server 270 and/or market data server 280). These parameters are discussed in greater detail below with respect to FIGS. 3 and 4.

In one embodiment, parameter identification component 225 identifies decumulation parameters that may be used in generating a recommended retirement profile. For example, parameter identification component 225 may identify the decumulation parameters by retrieving/receiving one or more decumulation parameters from a memory (e.g., data store 250) or from client computing device 260 (e.g., by querying client computing device 260 and receiving input from the retiree using UI 265), and/or defining one or more decumulation parameters (e.g., computing parameters based on actuarial data, actuarial data, and/or historical retiree account data).

In one embodiment, calculations component 230 employs mathematical modeling to generate a recommended retirement profile based on the identified decumulation parameters. For example, calculations component 230 may mathematically model a retirement strategy for the retiree by computing a utility function that takes into account the various decumulation parameters. In addition to those decumulation parameters identified by parameter identification component 225, calculations component may also include simulation data, generated by, for example, simulation component 235. In one embodiment, simulation component 235 may perform market simulations which are utilized by calculations component 230. Simulation component 235 may use data retrieved from actuarial data server 270 (e.g., actuarial tables 275 which may be used to estimate life expectancy of the retiree and spouse, if applicable), and market data server 280 (e.g., market data 285 which may be used in predicting market trends). In some embodiments, simulation component 235 may generate market simulations based on non-normality models. For example, categories of non-normality may include serial correlation (in which asset returns are dependent on previous asset returns), "fat" tails (in which historical return distributions are negatively skewed due to extreme negative events), and correlation breakdown (in which expected linear correlations between asset classes tend to become nonlinear under extreme conditions). In one embodiment, calculations component 230 and simulation component 235 may generate a portfolio uncertainty profile, which indicates potential spreads in wealth over time for a particular recommended retirement profile given the likelihood of market fluctuations and extreme events. In one embodiment, simulation component 235 is combined with calculations component 230.

In one embodiment, comparison component 240 compares multiple retirement profiles. For example, comparison component 240 may compare a recommended retirement profile generated by calculations component 230 to one or more traditional retirement profiles. The traditional retirement profiles may also be generated by calculations component 230. In one embodiment, data associated with the traditional retirement profiles may be received from a different source. Comparison component 240 may utilize calculations component 230 to perform, for example, a calculation of certainty equivalence (CE) for each retirement profile, which may utilize data generated by simulation component 235 to simulate market conditions and life expectancies. In one embodiment, comparison component 240 may cause calculations component 230 to generate multiple recommended retirement profiles in which certain decumulation parameters are varied (e.g., varying a risk aversion parameter), which may be used to present the retiree with example scenarios in order to show how varying certain decumulation profiles may affect the recommended retirement profile.

In one embodiment, the data store 250 may be a memory (e.g., random access memory), a cache, a drive (e.g., a hard drive), a flash drive, a database system, or another type of component or device capable of storing data. The data store 250 may also include multiple storage components (e.g., multiple drives or multiple databases) that may also span multiple computing devices (e.g., multiple server computers), and may be cloud-based. In some embodiments, the data store 250 may be separate from retiree management server 210, and may be, for example, distributed among and accessible to client computing device 260, actuarial data server 270, and market data server 280.

Figure 3:
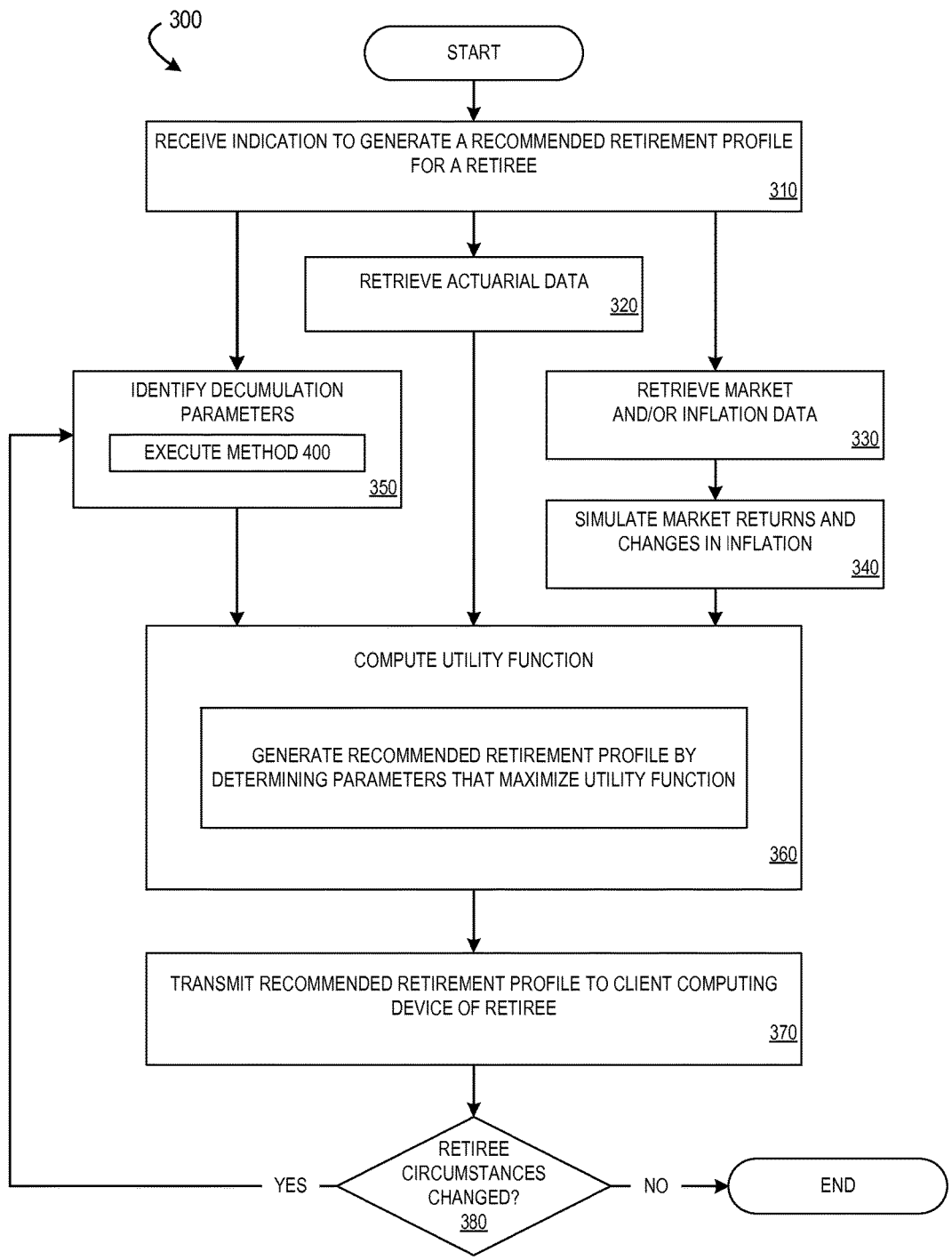
FIG. 3 is a flow diagram illustrating a method for generating a recommended retirement profile in accordance with an embodiment of the invention.
Figure 4:
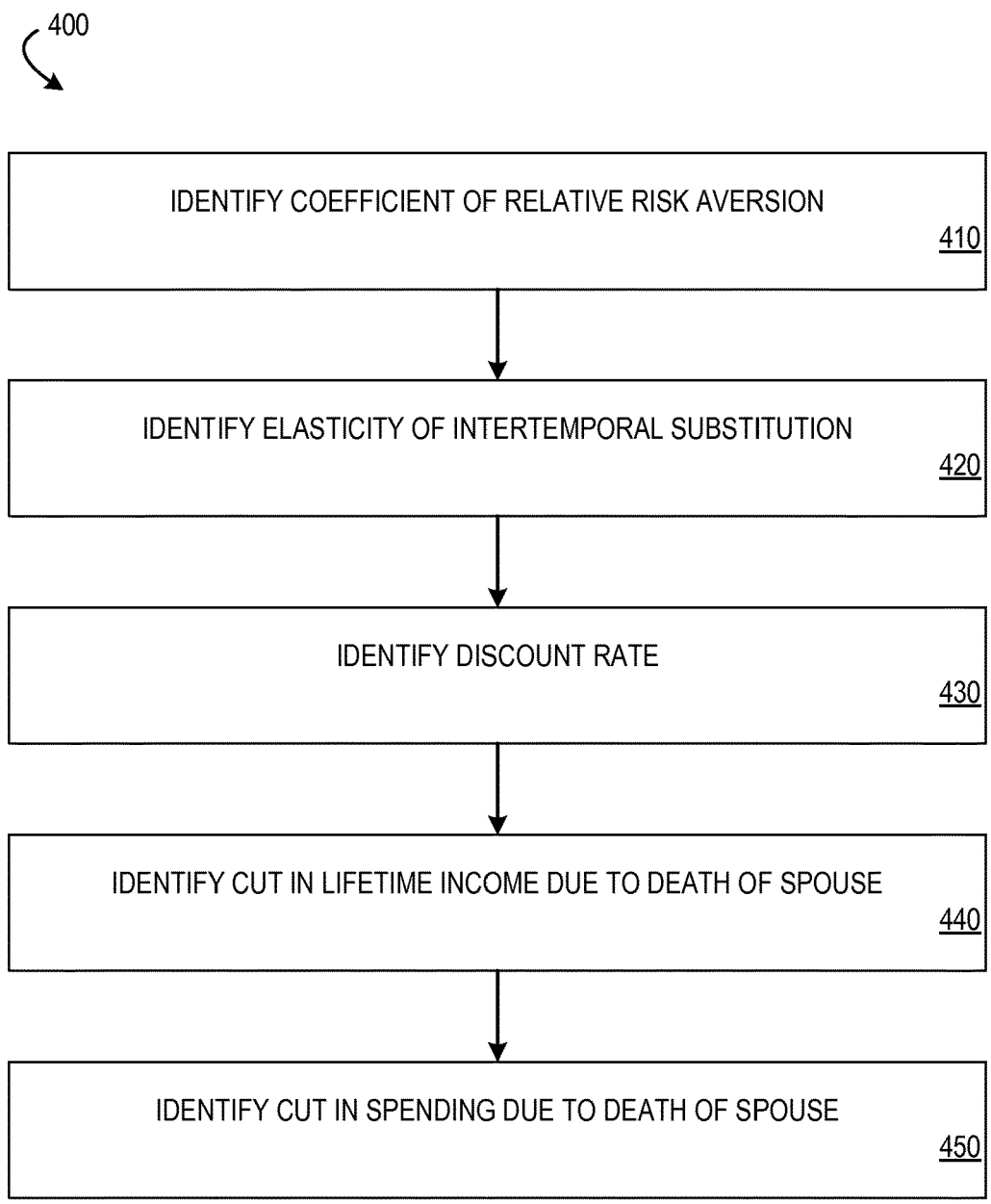
FIG. 4 is a flow diagram illustrating a method for identifying retirement profile parameters in accordance with an embodiment of the invention.

As illustrated in FIGS. 3 and 4, each of methods 300 and 400, respectively, may be performed by processing logic that may include hardware (e.g., circuitry, dedicated logic, programmable logic, microcode, etc.), software (such as instructions run on a processing device), or a combination thereof. In one embodiment, methods 300 and 400 may be performed by one or more processing components associated, respectively, with client module 215 and recommendation module 220 (which includes parameter identification component 225, calculations component 230, simulation component 235, and comparison component 240) of retiree management server 210.

FIG. 3 is a flow diagram illustrating a method 300 for generating a recommended retirement profile in accordance with an embodiment of the invention. Method 300 may be initiated at block 310, in which an indication to generate a recommended retirement profile for a retiree is received. The indication may be received, for example, by client module 215 of retiree management server 210. In one embodiment, the indication is a message generated at a client computing device by the retiree (e.g., generated at client computing device 260 with UI 265), the message indicating that the retiree desires to receive a recommended retirement profile and/or that retirement parameters relating to the retiree have been updated/changed. The indication received from client computing device 260 may contain a set of data including new or updated retirement parameters. Client module 215 may store at least some of the received parameters in data store 250 to associate them with a retirement account of the retiree.

In one embodiment, the indication may be received from a device other than client computing device 260. For example, updated actuarial or market data used in generating a recommended retirement profile may be received by recommendation module 220, which may trigger the execution of block 310. In one embodiment, the indication may be received in the form of a pre-scheduled update to the stored retirement account of the retiree. For example, retiree management server 210 may schedule periodic updates (e.g., monthly updates, yearly updates, etc.) to the recommended retirement profile, which may include requesting information from the retiree (e.g., using client module 215), and/or retrieving updated data from an actuarial data server (e.g., actuarial data server 270) and/or a market data server (e.g., market data server 280).

At block 320, actuarial data is retrieved, for example, from the actuarial data server (e.g., actuarial data server 270), and may be stored in a memory (e.g., data store 250). In one embodiment, the actuarial data may have already been stored in the memory and may be readily accessible. In such embodiments, the actuarial data may be retrieved directly from the memory (e.g. data store 250 of retiree management server 210).

It should be appreciated by one or ordinary skill in the art that block 320 may be executed in accordance with various embodiments. For example, block 320 may be executed before, after, or concurrently with block 310, may be combined with block 310 (e.g., when updated actuarial data serves as the indication to generate the recommended retirement profile) or other blocks of method 300, or omitted in some embodiments.

At block 330, market and/or inflation data is retrieved, for example, from the market data server (e.g., market data server 280), and may be stored in the memory (e.g., data store 250). In one embodiment, the market and/or inflation data may have already been stored in the memory and may be readily accessible. In such embodiments, the market and/or inflation data may be retrieved directly from the memory (e.g. data store 250 of retiree management server 210).

It should be appreciated by one or ordinary skill in the art that block 330 may be executed in accordance with various embodiments. For example, block 330 may be executed before, after, or concurrently with block 310, may be combined with block 310 (e.g., when updated market data serves as the indication to generate the recommended retirement profile) or other blocks of method 300, or omitted in some embodiments.

Using the retrieved market and/or inflation data, method 300 proceeds to block 340. At block 340, market returns and changes in inflation are simulated (e.g., using simulation component 235). The simulations may generate, for example, random equity and bond returns over a future period (e.g., about 30 years or more). In some embodiments, the simulations may utilize historical data as an input for the simulations, which may be retrieved from a market data source (e.g., market data server 280). Data generated by the simulations may be stored in the memory (e.g., data store 250) and used downstream in method 300, for example, to compute a certainty equivalence and/or a portfolio uncertainty profile.

At block 350, a plurality of decumulation parameters are identified (e.g., using parameter identification component 225). The decumulation parameters may be identified based on previously stored parameters relating to the retiree (e.g., a current age of the retiree, a current wealth level, etc.), may be retrieved from the retiree directly (e.g., querying the retiree at a client device), or may be generated based on other stored data. Block 350 may cause method 400 to be performed to identify specific decumulation parameters.

Reference is now made to FIG. 4. FIG. 4 is a flow diagram illustrating a method 400 for identifying retirement profile parameters in accordance with an embodiment of the invention. In one embodiment, method 300 may be initiated by block 350 of method 300. In one embodiment, method 400 may be executed in response to determining that one or retirement parameters of the retiree have changed (e.g., as will be discussed below with block 380 of FIG. 3). Method 400 may be executed, for example, by parameter identification component 225 described with regard to FIG. 2.

At block 410, a coefficient of relative risk aversion is identified. In one embodiment, the coefficient of relative risk aversion may have been specified by the retiree directly. As an illustrative example, UI 265 may include a slide bar that is normalized between two extreme positions: a lowest relative risk aversion indicating a high risk tolerance of the retiree, and a highest relative risk aversion indicative of a low risk tolerance of the retiree. However, any other suitable method may be used to gauge the retiree's risk tolerance. In one embodiment, the coefficient of relative risk aversion may be determined automatically (e.g., by parameter identification component 225). For example, historical data related to the retiree's previous investments may be processed to determine a value for the coefficient of relative risk aversion. In one embodiment, an operator of the retiree management platform (e.g., a financial planner/advisor) may specify the coefficient of relative risk aversion based on his/her interpretation of the historical data and/or his/her interactions with the retiree.

At block 420, an elasticity of intertemporal substitution (EIS) is identified. The EIS serves as a measure of responsiveness of a consumption growth rate to a real interest rate. An EIS value of 1 is indicative of a one-to-one correspondence between the growth rate of consumption and the real interest rate. An EIS value greater than 1 indicates that consumption growth is highly sensitive to changes in the real interest rate, and an EIS value less than 1 indicates that the consumption growth is less sensitive to changes in the real interest rate. The EIS may be estimated using micro- and macroeconomic data (e.g., retrieved from market data server 280) which takes into account the sensitivity of consumption to changes in real interest rates. Different estimates of the EIS may be utilized by various embodiments, as would be appreciated by one of ordinary skill in the art, depending on the anticipated behavior of a relevant population. In some embodiments, the EIS value may be a pre-defined value that is retrieved from a memory (e.g., data store 250).

At block 430, a discount rate is identified. The discount rate relates to an emotional aspect of the retiree's preference for withdrawals, which may relates to an attractiveness of income received at the present time versus income received in the future. The discount rate may be a pre-defined value that is retrieved from the memory (e.g., data store 250). In some embodiments, the discount rate may be generated based on historical information related to the retiree or generated based on a value that has been determined to work well for other retirees having similar circumstances to the retiree (e.g., age range, initial wealth, spending/withdrawal habits, etc.).

At block 440, a cut in lifetime income due to death of the spouse of the retiree is identified. The lifetime income may include, for example, social security benefits, a pension, etc., that is received by the spouse of the retiree. The cut in lifetime income may be selected or identified based on a value that maintains utility parity, which may be determined by the cut to social security upon death of spouse, and also based on the utility function parameterization. In some embodiments, the cut in lifetime income may be a one-third reduction in lifetime income upon the death of the spouse, which is an approximation based on the current Social Security formula rules applied to a couple with one working spouse. In some embodiments, the exact reduction in Social Security benefits varies depending on the unique circumstances of the couple. In some embodiments, lifetime income information for the couple may be received directly from the retiree (e.g., from client computing device 260), or may have been a previously known value stored in the memory (e.g., data store 250).

At block 450, a cut in spending due to death of the spouse of the retiree is identified. The cut in spending may be an estimated amount of spending that is attributed to the spouse of the retiree. For example, the cut in spending may be less than half of the total spending of the couple. A value of the cut in spending may be received directly from the retiree (e.g., from client computing device 260), or may or may have been a previously known value stored in the memory (e.g., data store 250). In some embodiments, the value of the cut in spending may be defined automatically (e.g., by parameter identification component 225), for example, by taking into account a total spending amount of the couple and using estimating the reduction in spending based on data related to other couples having circumstances similar to the retiree and spouse (e.g., age range, initial wealth, spending/withdrawal habits, etc.).

Each parameter of method 400, once identified, may be stored in an appropriate location (e.g., data store 250) for utilization in generating a recommended retirement profile (e.g., using recommendation module 220).

Referring once again to FIG. 3, at block 360, a utility function is computed (e.g., using calculations component 230), which may utilize any of the decumulation factors described herein. In one embodiment, the utility function is a recursive Epstein-Zin type utility function. For example, a suitable utility function for an individual retiree may be of the form:

$$U_{I,t}(W_t, G) = \begin{cases} \left[ \dfrac{\beta^t m_t}{\sum_{i=t}^{120} \beta^i m_i}(C_t + G)^\mu + \dfrac{\sum_{i=t+1}^{120} \beta^i m_i}{\sum_{i=t}^{120} \beta^i m_i} E_t[U_{I,t+1}(W_{t+1}, G)^{1-\gamma}]^{\frac{\mu}{1-\gamma}} \right]^{\frac{1}{\mu}} & \text{for } t < 120 \\ W_t + G & \text{for } t = 120 \end{cases} \quad \text{(Eq. 1)}$$

where:
$\mu = 1 - 1/\alpha$,
$W_{t+1} = (W_t - C_t)R_t$,
$R_t = A_t \cdot X$,
$C_t$ is the individual's withdrawal amount from his/her portfolio at age t,
$A_t$ is the individual's asset allocation ratio at age t,
G is the guaranteed real income that the individual has each year from sources such as social security and annuities,
$\beta$ is the individual's subjective discount factor,
$m_i$ is the probability that the individual is still alive at age i given that the individual is alive at age t,
$\gamma$ is the risk aversion parameter of the individual,
$\alpha$ is the individual's elasticity of intertemporal substitution,
$W_t$ is the individual's portfolio value at age t, and
X is a random variable representing a joint stock bond real return distribution.

In Eq. 1, the unknown parameters are $C_t$ (withdrawal amounts) and $A_t$ (allocation ratios), which, when solved for, correspond to values that maximize the retiree's total lifetime utility. In one embodiment, Eq. 1 is solved for the retiree (male or female) using backward induction from age 120 to 60 using concepts from the field of dynamic programming, which is a body of work that specifically deals with finding optimal solutions to multi-period problems with several decision variables at each stage. A continuous wealth to guarantee ratio space is discretized in uneven intervals with a higher concentration of points toward the lower ratios. The value function may be interpolated between mesh points using cubic splines. Expectation values for stock-bond-inflation distributions may be performed with random draws from assumed distributions (e.g., 10,000 random draws in one embodiment).

After solving the utility function for the individual, a joint utility function for a couple (if applicable) may be computed:

$$U_{C,t}(W_t, G) = \begin{cases} \left[ \dfrac{\beta^t m_t}{\sum_{i=t}^{120} \beta^i m_i}(C_t + G)^\mu + \dfrac{\sum_{i=t+1}^{120} \beta^i m_i}{\sum_{i=t}^{120} \beta^i m_i} E_t[U_{C,t+1}(W_{t+1}, G)]^{\frac{\mu}{1-\gamma}} \right]^{\frac{1}{\mu}} & \text{for } t < 120 \\ W_t + G & \text{for } t = 120 \end{cases} \quad \text{(Eq. 2)}$$

where:

$$U_{C,t+1}(W_{t+1}, G) = \dfrac{q_{M,t} q_{F,t} U_{C,t+1}(W_{t+1}, G)^{1-\gamma} +}{q_{M,t} + q_{F,t} - q_{M,t} q_{F,t}} + \dfrac{q_{M,t}(1 - q_{F,t}) U_{M,t+1}\left(\dfrac{W_{t+1}}{1-e}, \dfrac{(1-h)G}{(1-e)}\right)^{1-\gamma}}{q_{M,t} + q_{F,t} - q_{M,t} q_{F,t}} + \dfrac{(1 - q_{M,t}) q_{F,t} U_{F,t+1}\left(\dfrac{W_{t+1}}{1-e}, \dfrac{(1-h)G}{(1-e)}\right)^{1-\gamma}}{q_{M,t} + q_{F,t} - q_{M,t} q_{F,t}}$$

$\mu = 1 - 1/\alpha$,
$W_{t+1} = (W_t - C_t)R_t$,
$R_t = A_t \cdot X$,
$C_t$ is the couple's withdrawal amount from their portfolio at age t,
$A_t$ is the couple's asset allocation ratio at age t,
$\beta$ is the couple's subjective discount factor,
$m_i$ is the probability that at least one member of the couple is still alive at age i given that both members are alive at age t,
$\gamma$ is the risk aversion parameter of the couple,
$\alpha$ is the couple's elasticity of intertemporal substitution,
$W_t$ is the couple's portfolio value at age t,
h is the percentage of guarantee lost when one member of the couple dies,
e is the percentage spending would go down to maintain the same utility when one member of the couple dies,
$q_{M,t}$ is the probability that the male is still alive in one year given that he is alive at age t,
$q_{F,t}$ is the probability that the female is still alive in one year given that she is alive at age t,
$R_t$ is a random variable representing the real return of the portfolio, and
X is the random variable representing a joint stock bond real return distribution.

Due to the isoelastic nature of the utility function, the following identify may be used to facilitate the computations:

$$U(\lambda W_t, \lambda G) = \lambda U(W_t, G) \quad \text{(Eq. 3)}$$

A calculation of certainty equivalence may also be computed. The certainty equivalence may be defined by:

$$CE = \left[ \dfrac{\sum_{j=A}^{\max(d)} \beta^j p_j \left( \dfrac{1}{np_j} \left[ \sum_{i=1}^{n} I_{1,i,j}(C_{i,j} + G)^{1-\gamma} + \sum_{i=1}^{n} I_{2,i,j}\left( \dfrac{C_{i,j} + (1-h)G}{1-e} \right)^{1-\gamma} \right] \right)^{\frac{\mu}{1-\gamma}}}{\sum_{j=A}^{\max(d)} \beta^j p_j} \right]^{\frac{1}{\mu}} \quad \text{(Eq. 4)}$$

where:
$\mu = 1 - 1/\alpha$, $$p_j = \dfrac{\sum_{i=1}^{n} I_{1,i,j} + \sum_{i=1}^{n} I_{2,i,j}}{n},$$

n is the number of simulations, $C_{i,j}$ is the individual's (or couple's) withdrawal from his/her (their) portfolio at age j in simulation i, β is the individual's (or couple's) subjective discount factor, $d_i$ is the death age of the individual or last survivor of the couple in simulation i, γ is the risk aversion parameter of the individual (or couple), A is the starting age of retirement, $I_{1,i,j}$ is an indicator function of whether both members of the couple are still alive or not in period j of simulation i, and $I_{2,i,j}$ is an indicator function of whether one member of the couple is still alive or not in period j of simulation i.

At block 370, the recommended retirement profile is transmitted to the client computing device of the retiree (e.g., transmitted from retiree management server 210 to client computing device 260). The recommended retirement profile may include one or more recommended withdrawal amounts and/or one or more recommended asset allocation ratios. For example, the retiree may receive at the client computing device a recommended withdrawal amount for a current year, one or more future years, or all years of the retirement period. Similarly, the retiree may also, or alternatively, receive a recommended asset allocation ratio for a current year, one or more future years, or all years of the retirement period. The recommended retirement profile may be presented to the retiree with a UI of the client computing device (e.g., UI 265). In one embodiment, the recommended retirement profile may also include data for showing comparisons between the recommended retirement profile and other retirement strategies, data for showing comparisons between the recommended retirement profile for varying situations and circumstances, and/or data indicating uncertainty in withdrawal amounts and overall wealth based on the recommended retirement profile, which may each be presented to the retiree on the client computing device.

At block 380, a determination is made as to whether the circumstances of the retiree have changed, which may be performed using any suitable manner described herein. In one embodiment, the retiree may indicate, using the client computing device (e.g., client computing device 260), that he/she wishes to update the recommended retirement profile based on a changed parameter (e.g., an amount of wealth that he/she would desire to have at a certain age, a large expense that may occur in the future, etc.). The method 300 may then dynamically update the recommended retirement profile by performing block 350, which may identify new decumulation parameters based on the feedback from the retiree. If no change are detected, then process 300 ends and may repeat continuously (e.g., at designated intervals) or in response to receiving a request from the retiree to generate a recommended retirement profile.

It should be noted that the sequence of operations described in conjunction with methods 300 and 400 may be different from that illustrated, respectively, in corresponding FIGS. 3 and 4, while some operations may be omitted without departing from the nature of the embodiments described herein. It should be appreciated by one of ordinary skill in the art that the blocks illustrated in methods 300 and 400 are provided for purposes of illustrating embodiments of the invention and are in no way intended to be limiting in scope.

Figure 5A:
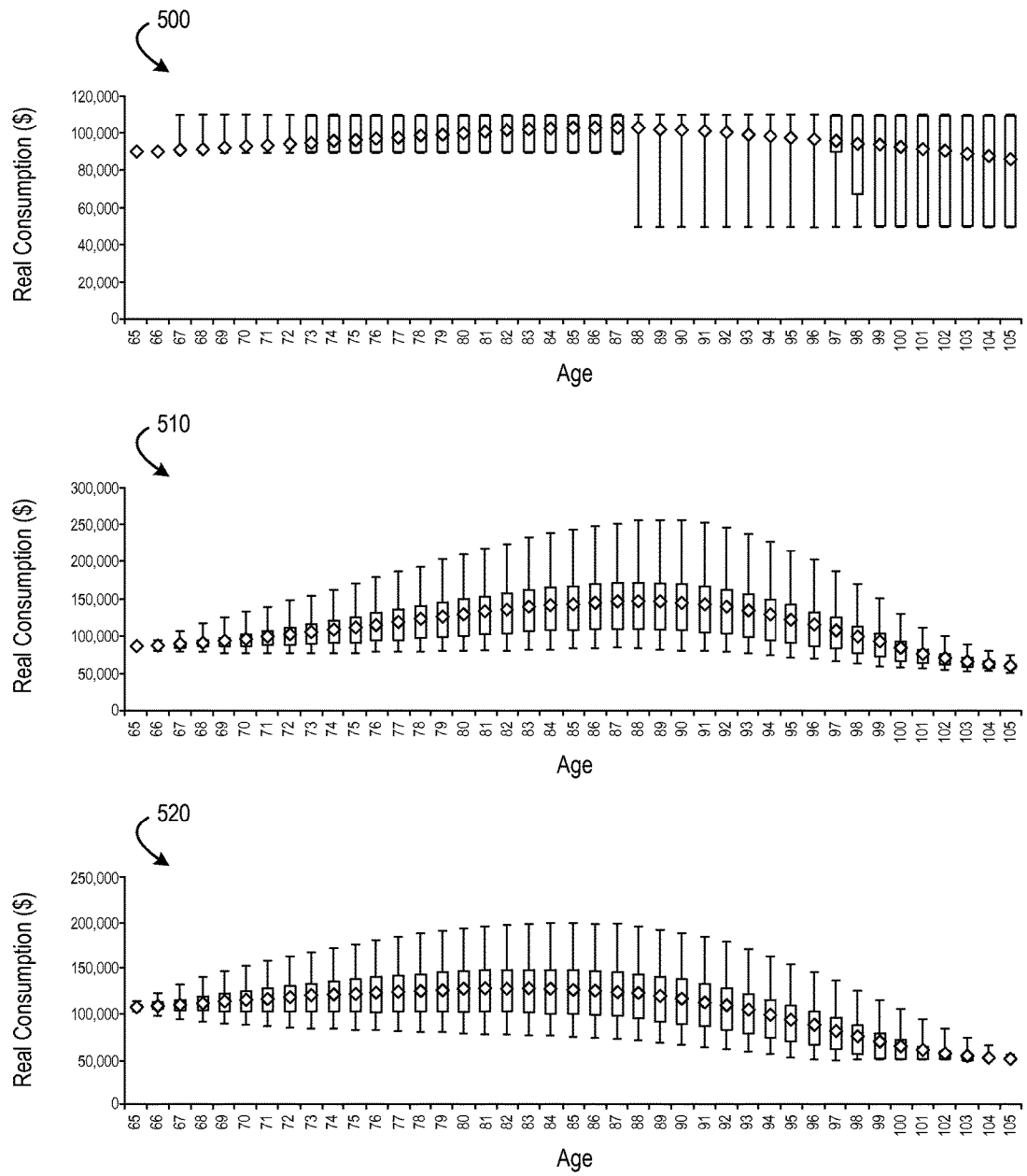
FIG. 5A compares predicted consumption of a retiree for retirement profiles generated by traditional methods and a method performed in accordance with an embodiment of the invention.
Figure 5B:
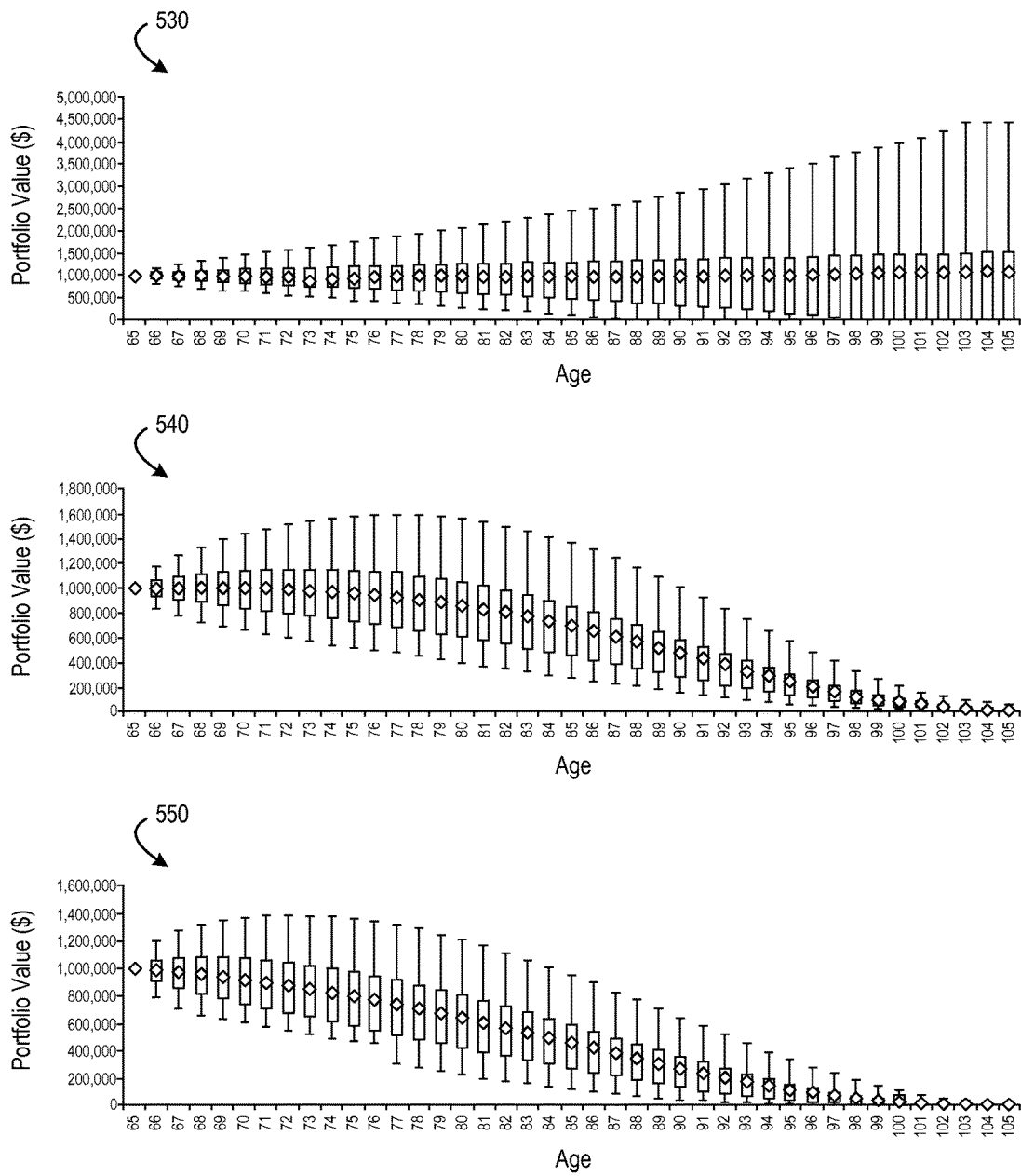
FIG. 5B compares predicted portfolio value of a retiree for retirement profiles generated by traditional methods and a method performed in accordance with an embodiment of the invention.

FIG. 5A compares predicted consumption of a retiree for retirement profiles generated by traditional methods and a method performed in accordance with an embodiment of the invention. FIG. 5B compares predicted portfolio value of a retiree for retirement profiles generated by traditional methods and a method performed in accordance with an embodiment of the invention. FIGS. 5A and 5B correspond, respectively, to an exemplary scenario for withdrawal potential (real consumption) and remaining portfolio value. The scenario corresponds to a 65 year old couple from ages 65 to 105, having $1 million in retirement savings and $50,000 in lifetime income.

Plots 500 and 530 correspond to a withdrawal strategy known as the "4% rule." Plots 510 and 540 correspond to a withdrawal strategy known as the "required minimum distribution (RMD) approach." Plots 520 and 550 correspond to a withdrawal strategy described in accordance with the embodiments of the present invention (hereinafter the "present model"). Each of the three withdrawal strategies were applied to the scenario described above, with 250,000 simulation performed across the entire retirement horizon until death. For each simulation, the market return each year drew from the 10,000 possible equity, bond and inflation scenarios used in our optimization process, covering strong rising periods to severe declines.

Plots 500 and 530 are based on the 4% rule. According to the 4% rule, an individual is to withdraw 4% of his/her initial portfolio value in the first year of retirement, and annually increase that amount by the inflation rate of the preceding year to maintain an equivalent purchasing power. Inflation increases may be estimated based on historical rates or long term averages. The 4% rule is a static rule, as dollar amounts are determined by portfolio value without taking into account individual retiree characteristics such as wealth, age, or lifetime income. As indicated in plots 500 and 530, the 4% rule generally provided a steady stream of income in real dollar terms during the early years of retirement, but began to breakdown around age 87, due to skewing factors such as survivorship bias calculated by the model. The probability range of potential consumption streams became relatively wide in later years, though the median payout remained relatively stable. The range of potential portfolio values, however, showed considerable variability, with significant risks of excess wealth accumulation in the median case and likelihood of premature depletion of assets in worse-case scenarios. In the 5th percentile case, retirees could potentially exhaust assets by age 85, which may be considered an unacceptably high probability given that there is a significant chance that at least one spouse will survive to that age.

Plots 510 and 540 are based on the RMD approach. The RMD approach is based on the amounts that the U.S. government requires retirees to withdraw from traditional Individual Retirement Accounts and employer-sponsored retirement plans beginning at age 70½. Annual withdrawals are determined using the following equation:

Withdrawal amount=Portfolio value/Remaining life expectancy

The RMD approach, like the 4% rule, does not take into account retiree wealth or lifetime income, but does consider age. As indicated in plots 510 and 540, the RMD approach was more effective at managing payouts than the 4% rule, reducing the likelihood of excess wealth accumulation or premature depletion of portfolio assets. This was because it incorporates portfolio experience and longevity, increasing payouts with age and increasing wealth. However, similar to the 4% rule, the RMD withdrawal rate is based largely on portfolio value, which can be volatile depending on actual experience. This risk is particularly evident in the spread between the top and bottom percentiles of plot 540.

Plots 520 and 550 are based on the present model. As indicated in plots 520 and 550, the present model appears to manage the risk of excess wealth accumulation and premature depletion of portfolio assets more effectively than the 4% rule. Although payouts were more variable than the 4% rule, they were more consistent than the RMD approach. This is because, unlike the RMD model, the present model actively adapts asset allocation and incorporates risk aversion through a utility function, both of which serve to smooth payouts due to fluctuations in portfolio value over time. In addition, consumption streams received a significant boost in the earlier years of retirement, offering the potential for greater payouts during earlier periods of retirement when retirees are more likely to derive utility from them.

In summary, the present model appears to offer a more balanced withdrawal strategy, while providing significantly less risk of both prematurely running out of money and leaving too much wealth untapped compared to the 4% rule. It also offered a more reliable stream of retirement income compared to the RMD approach, which is an important consideration for retirees dependent on a steady payout.

Figure 6:
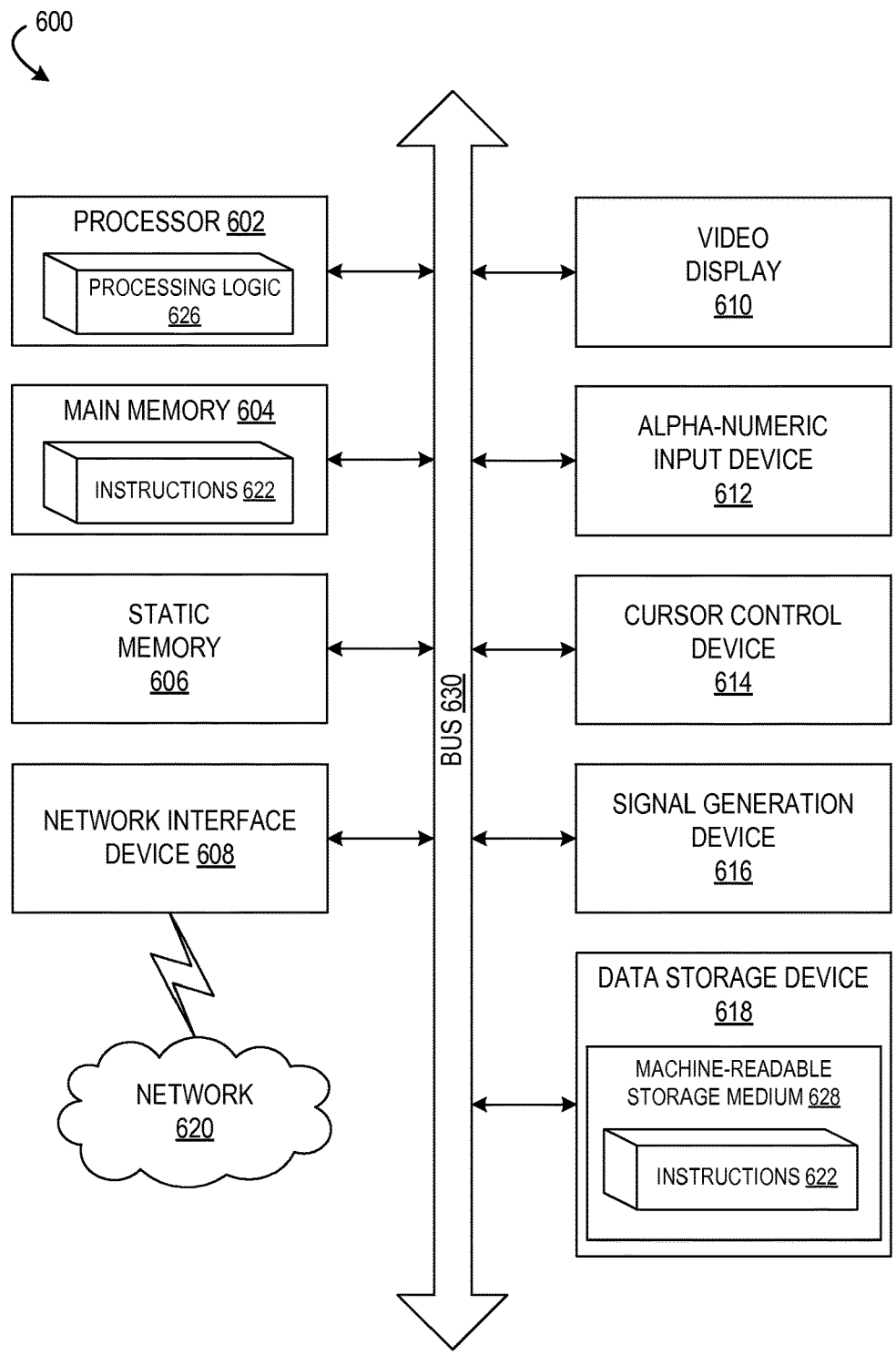
FIG. 6 illustrates a diagrammatic representation of a machine in the exemplary form of a computer system configured to perform one or more of the embodiments described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 may include a processor 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute processing logic 426 for performing the operations and steps discussed herein.

Computer system 600 may further include a network interface device 608. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium 628 (or more specifically a computer-readable storage medium) having one or more sets of instructions (e.g., software 622) embodying any one or more of the methodologies of functions described herein. For example, software 622 may store instructions to generate a recommended retirement profile. Software 622 may also reside, completely or at least partially, within main memory 604 and/or within processor 602 during execution thereof by computer system 600; main memory 604 and processor 602 also constituting machine-readable storage media. Software 622 may further be transmitted or received over a network 620 via network interface device 608.

Machine-readable storage medium 628 may also be used to store instructions to generate a recommended retirement profile. While machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall also be taken to include, but not be limited to, transitory computer-readable storage media, including, but not limited to, propagating electrical or electromagnetic signals. The term "machine-readable storage medium" shall also be taken to include non-transitory computer-readable storage media including, but not limited to, volatile and non-volatile computer memory or storage devices such as a hard disk, solid-state memory, optical media, magnetic media, floppy disk, USB drive, DVD, CD, media cards, register memory, processor caches, random access memory (RAM), etc.

Whereas many alterations and modifications of the present invention will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite those features regarded as the invention.

What is claimed is:

1. A computer-implemented method, the method comprising:

displaying a user interface at a client computing device of a retiree;

receiving, by a processor, an indication to generate a recommended retirement profile for the retiree, wherein the indication includes one or more retiree parameters;

automatically identifying, by the processor, a set of decumulation parameters related to the retiree based on the received indication;

retrieving, by the processor, financial market change data upon receiving the indication to generate the recommended retirement profile, wherein the financial market change data comprises changes in monetary inflation data;

computing, by the processor, a first utility function based on the set of decumulation parameters and the financial market change data, wherein the first utility function is a recursive Epstein-Zin type utility function;

generating, by the processor, the recommended retirement profile based on the computed first utility function;

transmitting, by the processor, the recommended retirement profile to the client computing device of the retiree;

displaying the recommended retirement profile on the user interface at the client computing device of the retiree;

receiving, by the processor, one or more updated retiree parameters;

identifying, by the processor, another set of decumulation parameters for the retiree based on the received one or more updated retiree parameters;

computing, by the processor, a second utility function based on the identified another set of decumulation parameters for the retiree, wherein the second utility function is a recursive Epstein-Zin type utility function;

updating, by the processor, the generated recommended retirement profile based on the computed second utility function;

transmitting, by the processor, the updated recommended retirement profile to the client computing device of the retiree; and displaying the updated recommended retirement profile on the user interface at the client computing device of the retiree.

2. The method of claim 1, wherein the set of decumulation parameters comprises at least one of:
a risk aversion parameter and a subjective discount factor for the retiree.

3. The method of claim 1, further comprising:
generating, by the processor, a first predicted consumption plot associated with the retiree based on the recommended retirement profile and a second predicted consumption plot associated with the retiree based on a previously stored traditional retirement profile;

transmitting, by the processor, the recommended retirement profile including the first predicted consumption plot and the second predicted consumption plot to the client computing device of the retiree; and displaying the first predicted consumption plot and the second predicted consumption plot simultaneously on the user interface at the client computing device of the retiree.

4. The method of claim 1, wherein the computing of each of the first utility function and the second utility function further comprises:
identifying, by the processor, at least one recommended withdrawal rate and at least one recommended asset allocation ratio in order to maximize each of the first utility function and the second utility function.

5. The method of claim 1, wherein the set of decumulation parameters comprise at least one of:
a current wealth level of the retiree, a current age of the retiree, a life expectancy of the retiree, a risk aversion parameter associated with the retiree, an elasticity of intertemporal substitution of the retiree, and a guaranteed real income of the retiree.

6. The method of claim 1, further comprising:
simulating, by the processor, the retrieved changes in the financial market change data over a predefined time period;

generating, by the processor, random equity data based on the simulated retrieved changes in the financial market change data over the predefined time period;

computing, by the processor, a third utility function based on the generated random equity data;

further updating, by the processor, the generated recommended retirement profile based on the computed third utility function;

transmitting, by the processor, the further updated generated recommended retirement profile to the client computing device of the retiree; and displaying the further updated generated recommended retirement profile on the user interface at the client computing device of the retiree.

7. The method of claim 1, wherein each of the first utility function and the second utility function is computable as a utility function U according to the following:

$$U_{I,t}(W_t, G) = \left[ \frac{\beta^t m_t}{\sum_{i=t}^{120} \beta^i m_i} (C_t + G)^\mu + \frac{\sum_{i=t+1}^{120} \beta^i m_i}{\sum_{i=t}^{120} \beta^i m_i} E_t[U_{I,t+1}(W_{t+1}, G)^{1-\gamma}]^{\frac{\mu}{1-\gamma}} \right]^{\frac{1}{\mu}}$$

for $t < 120$;

and
$U_{I,t}(W_t, G) = (W_t + G)$ for $t = 120$,
where:

$$\mu = 1 - \frac{1}{\alpha};$$

$W_t+1 = (W_t - C_t)R_t$;
$R_t = A_t \cdot X$;
$C_t$ is a withdrawal amount of the retiree at age t;
$A_t$ is an asset allocation ratio of the retiree at age t;
G is a guaranteed annual real income of the retiree;
β is a subjective discount factor of the retiree;
$m_i$ is a probability that the retiree will be alive at age i given that the retiree is alive at age t;
γ is a risk aversion parameter of the retiree;
α is an elasticity of intertemporal substitution of the retiree;
$W_t$ is a portfolio value of the retiree at age t; and
X is a random variable representing a joint stock bond real return distribution.

8. A system, comprising one or more retiree management servers, client devices, and data sources, and further comprising a memory, wherein the memory is configured to store programmed instructions, and one or more processors, wherein the one or more processors are configured to execute the stored programmed instructions to:
display a user interface at a client computing device of a retiree;

receive an indication to generate a recommended retirement profile for the retiree, wherein the indication includes one or more retiree parameters;

automatically identify a set of decumulation parameters related to the retiree based on the received indication;

retrieve financial market change data from the memory upon receiving the indication to generate the recommended retirement profile, wherein the financial market change data comprises changes in monetary inflation data;

compute a first utility function based on the set of decumulation parameters and the financial market change data, wherein the first utility function is a recursive Epstein-Zin type utility function;

generating the recommended retirement profile based on the computed first utility function;

transmit the recommended retirement profile to the client computing device of the retiree;

display the recommended retirement profile on the user interface at the client computing device of the retiree;

receive one or more updated retiree parameters;

identify another set of decumulation parameters for the retiree based on the received one or more updated retiree parameters;

compute a second utility function based on the identified another set of decumulation parameters for the retiree, wherein the second utility function is a recursive Epstein-Zin type utility function;

update the generated recommended retirement profile based on the computed second utility function;

transmit the updated recommended retirement profile to the client computing device of the retiree; and display the updated recommended retirement profile on the user interface at the client computing device of the retiree.

9. The system of claim 8, wherein the set of decumulation parameters comprises at least one of:

a risk aversion parameter and a subjective discount factor for the retiree.

10. The system of claim 8, wherein the one or more processors are further configured to execute the stored programmed instructions to:

generate a first predicted consumption plot associated with the retiree based on the recommended retirement profile and a second predicted consumption plot associated with the retiree based on a previously stored traditional retirement profile;

transmit the recommended retirement profile including the first predicted consumption plot and the second predicted consumption plot to the client computing device of the retiree; and display the first predicted consumption plot and the second predicted consumption plot simultaneously on the user interface at the client computing device of the retiree.

11. The system of claim 8, wherein the set of decumulation parameters comprise at least one of:

a current wealth level of the retiree, a current age of the retiree, a life expectancy of the retiree, a risk aversion parameter associated with the retiree, an elasticity of intertemporal substitution of the retiree, and a guaranteed real income of the retiree.

12. The system of claim 8, wherein the one or more processors are further configured to execute the stored programmed instructions to:

simulate the retrieved changes in the financial market change data over a predefined time period;

generate random equity data based on the simulated retrieved changes in the financial market change data over the predefined time period;

compute a third utility function based on the generated random equity data;

further update the generated recommended retirement profile based on the computed third utility function;

transmit the further updated generated recommended retirement profile to the client computing device of the retiree; and display the further updated generated recommended retirement profile on the user interface at the client computing device of the retiree.

13. The system of claim 8, wherein the one or more processors are further configured to execute the stored programmed instructions to:

identify at least one recommended withdrawal rate and at least one recommended asset allocation ratio in order to maximize each of the first utility function and the second utility function.

14. The system of claim 8, wherein each of the first utility function and the second utility function is computable as a utility function U according to the following:

$$U_{I,t}(W_t, G) = \left[\frac{\beta^t m_t}{\sum_{i=t}^{120} \beta^i m_i}(C_t + G)^\mu + \frac{\sum_{i=t+1}^{120} \beta^i m_i}{\sum_{i=t}^{120} \beta^i m_i} E_t[U_{I,t+1}(W_{t=1}, G)^{1-\gamma}]^{\frac{\mu}{1-\gamma}}\right]^{\frac{1}{\mu}}$$

for $t < 120$;

and
$U_{I,t}(W_t, G) = (W_t + G)$ for $t = 120$,
where:

$$\mu = 1 - \frac{1}{\alpha};$$

$W_t + 1 = (W_t - C_t)R_t$;
$R_t = A_t \cdot X$;
$C_t$ is a withdrawal amount of the retiree at age t;
$A_t$ is an asset allocation ratio of the retiree at age t;
G is a guaranteed annual real income of the retiree;
$\beta$ is a subjective discount factor of the retiree;
$m_i$ is a probability that the retiree will be alive at age i given that the retiree is alive at age t;
$\gamma$ is a risk aversion parameter of the retiree;
$\alpha$ is an elasticity of intertemporal substitution of the retiree;
$W_t$ is a portfolio value of the retiree at age t; and
X is a random variable representing a joint stock bond real return distribution.

15. A non-transitory computer-readable medium having stored thereon instructions for automatically generating a retirement plan for a retiree, comprising executable code which when executed by one or more processors, causes the one or more processors to:

display a user interface at a client computing device of a retiree;

receive an indication to generate a recommended retirement profile for the retiree, wherein the indication includes one or more retiree parameters;

automatically identify a set of decumulation parameters related to the retiree based on the received indication;

retrieve financial market change data upon receiving the indication to generate the recommended retirement profile, wherein the financial market change data comprises changes in monetary inflation data;

compute a first utility function based on the set of decumulation parameters and the financial market change data, wherein the first utility function is a recursive Epstein-Zin type utility function;

generate the recommended retirement profile based on the computed first utility function;
transmit the recommended retirement profile to the client computing device of the retiree;
display the recommended retirement profile on the user interface at the client computing device of the retiree;
receive one or more updated retiree parameters;
identify another set of decumulation parameters for the retiree based on the received one or more updated retiree parameters;
compute a second utility function based on the identified another set of decumulation parameters for the retiree, wherein the second utility function is a recursive Epstein-Zin type utility function;
update the generated recommended retirement profile based on the computed second utility function;
transmit the updated generated recommended retirement profile to the client computing device of the retiree; and
display the updated generated recommended retirement profile on the user interface at the client computing device of the retiree.

16. The non-transitory computer-readable medium of claim 15, wherein the set of decumulation parameters comprises at least one of:
a risk aversion parameter and a subjective discount factor for the retiree.

17. The non-transitory computer-readable medium of claim 15, wherein the executable code when executed by the one or more processors further causes the one or more processors to:
generate a first predicted consumption plot associated with the retiree based on the recommended retirement profile and a second predicted consumption plot associated with the retiree based on a previously stored traditional retirement profile;
transmit the recommended retirement profile including the first predicted consumption plot and the second predicted consumption plot to the client computing device of the retiree; and
display the first predicted consumption plot and the second predicted consumption plot simultaneously on the user interface at the client computing device of the retiree.

18. The non-transitory computer-readable medium of claim 15, wherein the set of decumulation parameters comprise at least one of:
a current wealth level of the retiree, a current age of the retiree, a life expectancy of the retiree, a risk aversion parameter associated with the retiree, an elasticity of intertemporal substitution of the retiree, and a guaranteed real income of the retiree.

19. The non-transitory computer-readable medium of claim 15, wherein the executable code when executed by the one or more processors further causes the one or more processors to:
simulate the retrieved changes in the financial market change data over a predefined time period;
generate random equity data based on the simulated retrieved changes in the financial market change data over the predefined time period;
compute a third utility function based on the generated random equity data;
further update the generated recommended retirement profile based on the computed third utility function;
transmit the further updated generated recommended retirement profile to the client computing device of the retiree; and
display the further updated recommended retirement profile on the user interface at the client computing device of the retiree.

20. The non-transitory computer-readable medium of claim 15, wherein the executable code when executed by the one or more processors further causes the one or more processors to:
identify at least one recommended withdrawal rate and at least one recommended asset allocation ratio in order to maximize each of the first utility function and the second utility function.

21. The non-transitory computer-readable medium of claim 15, wherein each of the first utility function and the second utility function is computable as a utility function U according to the following:

$$U_{I,t}(W_t, G) = \left[ \frac{\beta^t m_t}{\sum_{i=t}^{120} \beta^i m_i} (C_t + G)^\mu + \frac{\sum_{i=t+1}^{120} \beta^i m_i}{\sum_{i=t}^{120} \beta^i m_i} E_t[U_{I,t+1}(W_{t=1}, G)^{1-\gamma}]^{\frac{\mu}{1-\gamma}} \right]^{\frac{1}{\mu}}$$

for $t < 120$;

and
$U_{I,t}(W_t, G) = (W_t + G)$ for t=120,
where:

$$\mu = 1 - \frac{1}{\alpha};$$

$W_t + 1 = (W_t - C_t)R_t$;
$R_t = A_t \cdot X$;
$C_t$ is a withdrawal amount of the retiree at age t;
$A_t$ is an asset allocation ratio of the retiree at age t;
G is a guaranteed annual real income of the retiree;
β is a subjective discount factor of the retiree;
$m_i$ is a probability that the retiree will be alive at age i given that the retiree is alive at age t;
γ is a risk aversion parameter of the retiree;
α is an elasticity of intertemporal substitution of the retiree;
$W_t$ is a portfolio value of the retiree at age t; and
X is a random variable representing a joint stock bond real return distribution.

* * * * *